Aug. 17, 1937.   R. OSHIMA   2,090,502
METHOD AND APPARATUS FOR MANUFACTURING CUT FILAMENT
SLIVER FROM CONTINUOUS FILAMENT TAPE
Filed July 30, 1936

Inventor
Ryoji Oshima
by Connolly Bros
Attys

Patented Aug. 17, 1937

2,090,502

UNITED STATES PATENT OFFICE 2,090,502

METHOD AND APPARATUS FOR MANUFACTURING CUT-FILAMENT SLIVER FROM CONTINUOUS FILAMENT TAPE

Ryoji Oshima, Yodobashiku, Tokyo, Japan

Application July 30, 1936, Serial No. 93,515

1 Claim. (Cl. 19—1)

This invention has relation to the manufacture of spinnable sliver from artificial fibre and consists in the method and means for cutting the continuous artificial filament tapes into separate lengths and piling the same in layers for further treatment.

The object of the invention is to produce spinnable fibers from the non-spinnable filaments produced by rayon making machines and to thereby simplify the operation by the elimination of several steps now found necessary and avoiding damage to the filaments during the spinning process.

Figure 1:
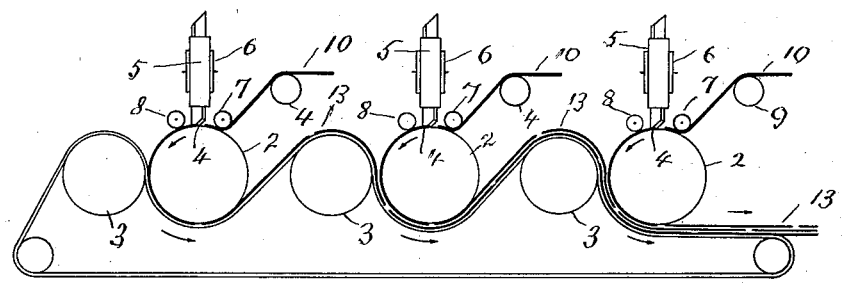
Fig. 1 is a front view in elevation of an apparatus for carrying my invention into effect.
Figure 2:
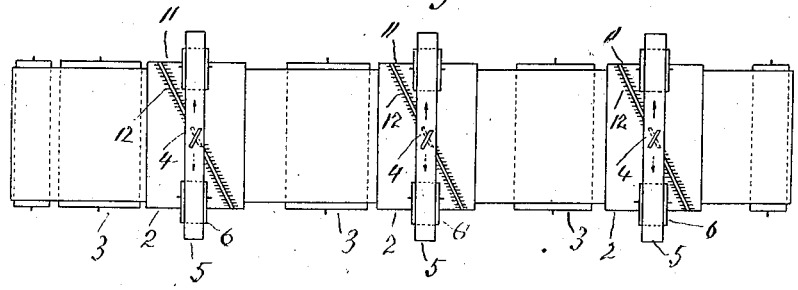
Fig. 2 is a plan view, omitting filament tapes, and other elements not requiring illustration.
Figure 3:
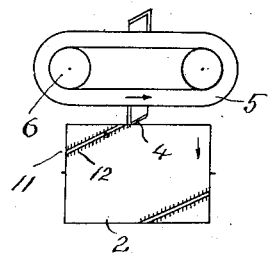
Fig. 3 is a side view of the cutting devices.
Figure 4:
Fig. 4 is a diagrammatic view of the tape, showing the cutting lines.

An apparatus conforming to the requirements of my invention comprises a series of feeding devices to supply filament tape to the apparatus, means for cutting the tapes diagonally or obliquely into short lengths and arranging the cut sections in layers suitable for spinning purposes.

In the drawing (1) designates a conveyer belt, (2) diagonally or oblique grooved rollers, (11) grooves in said rollers with small incisions in their edges, to prevent lateral slip of the filaments on the rollers (2). (4) are cutters carried by endless chains (6) on which several cutters are mounted at regular intervals and which cutters are arranged with their edges obliquely disposed. (7, 8) are pressing rollers for pressing the filaments into the grooves of the rollers (2). The endless chains run transversely to the lines of rotation of the rollers (2). (3) are guide pulleys to press the belt (1) on the rollers (2). As will be noted the cutting units are arranged in series. In the operation of the machine continuous filament tapes are fed between the rollers (2) and pressing rollers (7, 8) by the guide pulleys (3) and after being cut are carried on the belt (1) one filament tape upon another so as to form a layer which leaves the machine at one end to be further treated.

I claim

An apparatus for the production of spinnable slivers from artificial filaments comprising a series of cutting units arranged in serial order, and independently operative, each unit being provided with a spirally grooved roller, means for feeding separate tapes of artificial material to each of said rollers and associated cutting devices, means for cutting said tapes obliquely into sections, an endless belt on which the cut tapes are laid and carried and by which the independently cut filaments are piled in layers.

RYOJI OSHIMA.